Aug. 14, 1962 D. B. MORITZ ET AL Re. 25,225

SHORE ATTACHMENT COMBINATION

Original Filed Oct. 12, 1959

INVENTORS
HUGH J. FERGUSON &
DONALD B. MORITZ
BY Williams, Tilberry & Golrick
ATTORNEYS United States Patent Office Re. 25,225
Reissued Aug. 14, 1962

25,225

SHORE ATTACHMENT COMBINATION

Donald B. Moritz, Deerfield, Ill., and Hugh J. Ferguson, San Francisco, Calif., assignors to Waco-Porter Corporation, a corporation of Minnesota Original No. 2,988,318, dated June 13, 1961, Ser. No. 846,020, Oct. 12, 1959. Application for reissue Sept. 29, 1961, Ser. No. 173,596
(Filed under Rule 47(a) and 35 U.S.C. 116)
7 Claims. (Cl. 248—354)

Matter enclosed in heavy brackets [ ] appears in the original patent but forms no part of this reissue specification; matter printed in italics indicates the additions made by reissue.

The present invention is concerned generally with removable means for attaching an elongated member in adjustably telescoped relation in and on a tubular member; and more particularly with an attachment for supporting an extension member in a tubular element of a shore, shore panel or like load supporting member in a combination of adjustable length. For convenience of discussion the invention will be described however in terms of shore panel assemblies.

The extended areas and high load locations frequently to be shored in modern construction has led to the development of shoring systems utilizing a number of standard steel components intended to be assembled into particular shorting structures adapted to the particular needs of individual construction situations which could never be met by the old adjustable single strut-like or column-like shore units. Such systems are almost universally based upon shore panels—generally rectangular, flat or planar welded tubular steel frames, having open-ended side legs—which may be linked in horizontally spaced parallel relation by bolted connecting braces, and also tiered by use of connectors joining the legs of vertically aligned panels.

Since a complex shoring assembly may extend over a fundamental supporting area, either the ground or a lower building structure, varying in elevation from the location of one leg to another among the several panels; and in like fashion, where the legs of top panels, as well as load bearing ledgers thereof, may be used for load bearing supports or heads at different levels, various devices have been used to obtain quick yet precise top and bottom adjustments in the individual effective leg lengths.

Among such devices have appeared not only simple adjusting screws on the ends of legs in panels intended for use at the top or bottom of a shoring assembly, but also panels having adjusting screw devices accepting shore staffs, members extendable therethrough in telescope relation to a panel leg and coarsely adjustable lengthwise by a selectable pin connection through an extendable member and through a movable screw portion of the device, or through an element supported by the latter. However, panels of this character represent an increase in the number of basic components in a shoring system.

An object of the present invention is to provide an improved device for attaching such an extendable member to a panel leg. Another object is to provide a device itself removably attachable to the leg of a shoring panel leg which accepts an extendable member or shore staff assembly and maintains the same in a selected screw-adjusted telescoped relation or position relative to the leg. A still further object is to provide a device of the character described which permits a reduction in the number of components, particurlarly of types of panels required in a flexible shoring system.

Other objects and advantages of the invention will appear from the following description and the drawings wherein.

Figure 1:
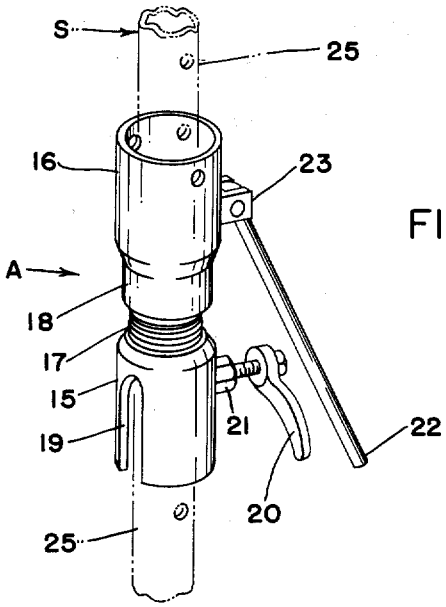
FIG. 1 is a detailed view of an attachment device per se.
Figure 2:
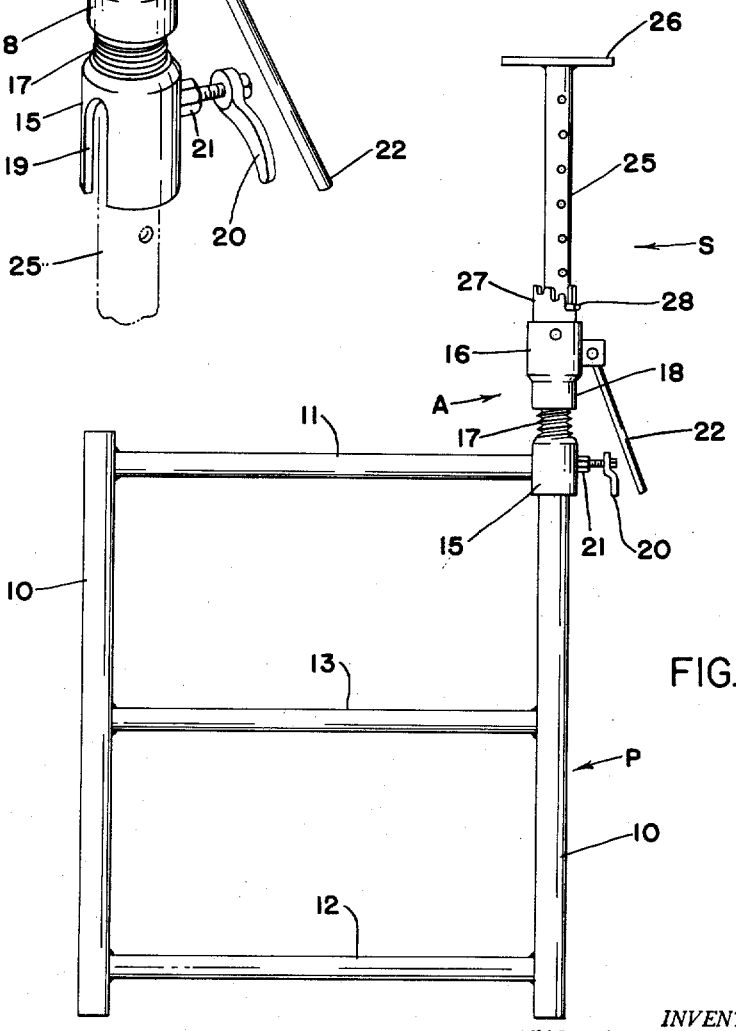
FIG. 2 is an elevational view of a shoring panel with a shoring staff assembly mounted thereto through the device of this invention.

The attachment device A of FIG. 1 is intended primarily for use with a shore staff S, which is shown in FIG. 2 by way of an example of the environment, attached to or applied to the top end of the tubular member or leg 10 of a shoring panel, a welded tubular steel unit or module comprised of the hollow parallel legs 10 joined by the top and bottom ledgers 11, 12 and intervening rung 13. Each staff assembly is removably attached to the tubular member provided by the panel leg in a telescoping vertically adjustable relation, giving an adjustable length here effected at the top of the leg.

The device A includes roughly cylindrical hollow bottom and top body portions or members 15 and 16 adjustably secured in coaxial alignment, by engagement of the male threaded reduced upper end 17 of the leg cap or bottom member 15 in the female threaded reduced lower end 18 of the top member.

The main part or body of the cap member, having an internal diameter adapted to receive the tubular member, here a panel leg 10 over and on which it may be applied or fitted by hand, is slotted at 19 on one side upwardly from the bottom end to receive or embrace as a radial projection of the tubular member the top ledger 11 when used as here on a shoring panel.

Preferably as a clamping means acting diametrically from the slot, there is provided a handle type clamping bolt 20 threaded radially through the cap body to bear in clamping relation on the tubular leg 10, as though a threaded radially apertured boss or a simple nut 21 welded to the body coincident with an aperture therethrough.

A handle 22, pinned at one end between the depending sides of a U-shaped piece 23 welded endwise to the side of the top member, may be swung or pivoted upwardly from normal downward dependant position to a generally radial position for use, in fine vertical screw adjustments, by rotation of top member 16 relative to cap 15, the latter being immobilized here by its slot engagement with the top ledger as well as by the clamping bolt.

The internal diameter of the necked or reduced male threaded end 17 of the cap, to conduce to staff stability will preferably correspond to the outside diameter of the staff tube 25, receiving the latter however in a readily manually set sliding fit, and so also will the internal diameter of the tubular member to which the device A is to be applied, here legs 10. The assembly of the staff S here is shown as a known form, including an elongated rod or a tube 25 provided with a head 26 adapted to engage particular supported work members or surfaces; and a slidable collar 27 as a stop means with bottom adapted to engage and be supported by the upper end of the attachment as a stop surface; the staff tube 25 in turn being supported at selected position on the top of the collar and hence on the attachment and ultimately the panel leg, by a pin 28 extending diametrically through the staff tube. For this purpose in this known form of staff means, the tube has along its length a series of space staff means, the tube has along its length a series of spaced diametric apertures, providing coarse increments of adjustment; and the top edge of collar 27 has a plurality of diametric pairs of pin-supporting downward slots or axially spaced steps of increasing depth equally to divide further the adjustment increments offered by the staff tube aperture spacing. Continuous fine adjustment over the span of the smallest increment afforded by the pin connection is then provided by the attachment screw.

Although the device and combination hereinbefore described is presented as applied to the upper end of a tubular member, on a panel leg, obviously the same may be applied to the bottom of a similar tubular member for required adjustment, say of panel legs to diverse under-supporting levels. Consequently only one type of panel is required, in conjunction with devices according to this invention, whether such vertical adjustment is to be made at the top of one or a tiered plurality of the panels for load support at areas of differing levels (e.g., with levels at both legs of a panel differing from each other as well as from the level of a load supporting ledger); or at the bottom of panels, to accommodate panels to diverse ground or under-supporting levels while maintaining verticality.

We claim:

1. For attachment of a longitudinally extended member in adjustably telescoped relation to an elongated tubular member having a lateral projection near one end thereof, a device comprising: first and second body portions of generally cylindrical form adapted to accept the extended member therethrough, said portions each having one end threadably engaged in axial alignment, the first body portion having its other end formed with an inward slot and adapted to receive socket-wise the said end of the tubular member with said projection engaged in said slot, and means on the first body portion adapted to secure the device on the end of said tubular member, the other end of said second body portion being adapted to provide a reaction surface engageable by stop means on the said extended member for supporting the latter at selected position against inward telescoping motion relative to the tubular member.

2. For attachment of a longitudinally extended member in adjustably telescoped relation to an elongated tubular member having a lateral projection near one end thereof, a device comprising: first and second body portions of generally cylindrical form each with one end reduced and threadably engaged in axial alignment, the first body portion having its other end formed with an inward slot and adapted to receive the said end of the tubular member with said projection engaged in said slot, and clamping means on the first body portion adapted to secure the device on the said end of said tubular member, the other end of said second body portion being adapted to provide a reaction surface engageable by stop means on the said extended member for supporting the latter against inward telescoping motion relative to the tubular member.

3. For attachment of a longitudinally extended shore staff in adjustably telescoped relation to a tubular leg of a shore panel having near one end a ledger extending radially thereof, a removable device comprising: first and second body portions of generally cylindrical form each with one end threadably engaged in axial alignment, the first body portion having its other end formed with an inward slot and adapted to receive socket-wise the said end of the tubular leg with said ledger engaged in said slot, and clamping means on the first body portion adapted to secure the device on the end of said tubular leg, the other end of said second body portion being adapted to provide a reaction surface engageable by stop means on the said shore staff for supporting the later against inward telescoping motion relative to the said leg.

4. For attachment of a longitudinally extended shore staff in adjustably telescoped relation to a tubular leg of a shore panel having near one end of ledger extending radially thereof, a removable device comprising: first and second body portions of generally cylindrical form each with one end threadably engaged in axial alignment, the first body portion having its other end formed with an inward slot and adapted to receive socket-wise the said end of the tubular leg with said ledger engaged in said slot, and radial clamping bolt means threaded through the first body portion into engagement with said leg diametrically from said slot for securing the device on the end of the leg, the other end of said second body portion being adapted to provide a reaction surface engageable by stop means on the said shore staff for supporting the latter against inward telescoping motion relative to the said leg.

5. The combination of a longitudinally extended shore staff and a removable device for attaching said staff in adjustably telescoped relation to a tubular leg of a shore panel, said panel including a ledger extending radially of said leg near one end of said leg, said device including: first and second body portions of generally cylindrical form each with one end threadably engaged in axial alignment, the first body portion having its other end formed with an inward slot and adapted to receive socket-wise the said end of the tubular leg with said ledger engaged in said slot, and radial clamping bolt means threaded through the first body portion into engagement with said leg diametrically from said slot for securing the device on the end of the leg, the other end of said second body portion being adapted to provide a reaction surface engageable by stop means on the said shore staff for supporting the latter against inward telescoping motion relative to the said leg; and stop means on the staff engaging said reaction surface, said stop means being selectively longitudinally positionable on said staff for determining a telescoped relation of the staff to said device and thereby to said tubular leg.

*6. For attachment of a longitudinally extended member in adjustably telescoped relation to an elongated tubular member having a lateral projection near one end thereof, a removable device comprising: first and second body portions of generally hollow cylindrical form adapted to accept the extended member therethrough, said portions having respective ends threadably engaged in axial alignment, the first body portion having an inward slot formed in its other end and having said other end adapted to receive socket-wise the said end of the tubular member with said projection engaged in said slot, the other end of said second body portion being adapted to provide a reaction surface engageable by stop means on the said extended member for supporting the latter at selected position against inward telescoping motion relative to the tubular member, and a lateral handle on the second body portion adapted for manual rotation of said second body portion in adjusting the length of said device.*

*7. The combination of a shore panel including a tubular leg having near one end a ledger extending radially thereof, a longitudinally extended shore staff in adjustably telescoped relation to said tubular leg and includings stop means locatable at longitudinally selected positions, and a removable device for attaching said members to each other in said relation, said device comprising: first and second body portions of generally hollow cylindrical form in axial alignment with respective ends threadably engaged, the first body portion having its other end formed with an inward slot and also having said other end adapted to receive socket-wise the said end of the tubular leg with said ledger engaged in said slot, the other end of said second body portion being adapted to provide a reaction surface engageable by said stop means on the said shore staff for supporting the latter against inward telescoping motion relative to the said leg, and a lateral handle element on the second body portion for manual rotation of said second body portion in adjusting the length of the device.*

References Cited in the file of this patent or the original patent

UNITED STATES PATENTS

| | | |
|---|---|---|
| 2,584,015 | Hawes | Jan. 29, 1952 |
| 2,777,660 | Albrecht | Jan. 15, 1957 |

FOREIGN PATENTS

| | | |
|---|---|---|
| 714,075 | Great Britain | Aug. 25, 1954 |
| 715,358 | Great Britain | Sept. 15, 1954 |